(12) United States Patent  (10) Patent No.: US 8,533,885 B2
Chen et al.  (45) Date of Patent: Sep. 17, 2013

(54) CLEANING DEVICE INCORPORATING CARBON NANOTUBES

(75) Inventors: Lu-Zhuo Chen, Beijing (CN);
Chang-Hong Liu, Beijing (CN);
Shou-Shan Fan, Beijing (CN)

(73) Assignees: Tsinghua University, Beijing (CN);
Hon Hai Precision Industry Co., Ltd., New Taipei (TW)

( * ) Notice: Subject to any disclaimer, the term of this patent is extended or adjusted under 35 U.S.C. 154(b) by 228 days.

(21) Appl. No.: 13/044,561

(22) Filed: Mar. 10, 2011

(65) Prior Publication Data

US 2012/0047670 A1 Mar. 1, 2012

(30) Foreign Application Priority Data

Aug. 25, 2010 (CN) .......................... 2010 1 0262472

(51) Int. Cl.
*B08B 1/00* (2006.01)

(52) U.S. Cl.
USPC ................. 15/1; 428/343; 428/357; 428/364; 428/397; 428/401; 428/402; 257/415; 361/233; 15/246

(58) Field of Classification Search
CPC ........................ H01H 2300/036; H01H 1/0094
USPC ................ 428/357, 364, 365, 343, 397, 398, 428/401, 402; 977/742, 750, 752, 753; 310/300, 309, 800; 15/1, 246
See application file for complete search history.

(56) References Cited

U.S. PATENT DOCUMENTS

| 7,112,464 | B2 * | 9/2006 | Jaiprakash et al. ............. 438/53 |
| 7,202,586 | B2 * | 4/2007 | Okubo ........................... 310/253 |
| 2005/0101112 | A1 * | 5/2005 | Rueckes et al. ............... 438/584 |
| 2008/0280137 | A1 * | 11/2008 | Ajayan et al. ................. 428/375 |

* cited by examiner

*Primary Examiner* — Mark Spisich
*Assistant Examiner* — Andrew A Horton
(74) *Attorney, Agent, or Firm* — Altis Law Group, Inc.

(57) ABSTRACT

A cleaning device includes a support and a cleaning arm partly embedded in the support. The cleaning arm includes a flexible polymer matrix and a carbon nanotube film structure at least partly embedded into the flexible polymer matrix. The carbon nanotube film structure includes a number of carbon nanotubes combined by van der Waals attractive force therebetween.

17 Claims, 13 Drawing Sheets

CLEANING DEVICE INCORPORATING CARBON NANOTUBES

RELATED APPLICATIONS

This application claims all benefits accruing under 35 U.S.C. §119 from China Patent Application No. 201010262472.6, filed on Aug. 25, 2010 in the China Intellectual Property Office, hereby incorporated by reference.

BACKGROUND

1. Technical Field

The present disclosure relates to cleaning devices, and particularly, to a cleaning device incorporating carbon nanotubes.

2. Description of Related Art

Ionic Polymer Metal Composites (IPMCs) are synthetic composite materials that display artificial muscle behavior under an applied voltage. IPMCs are composed of an ionic polymer like Nafion® or Flemion® whose planar surfaces are coated with conductors such as platinum or gold. Under an applied voltage (1-5V) on IPMCs, ion migration and electrostatic repulsion result in a bending actuation.

However, voltages above 1.23V applied on IPMCs will result in electrolysis of water, which limits the useful voltage range on IPMCs.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
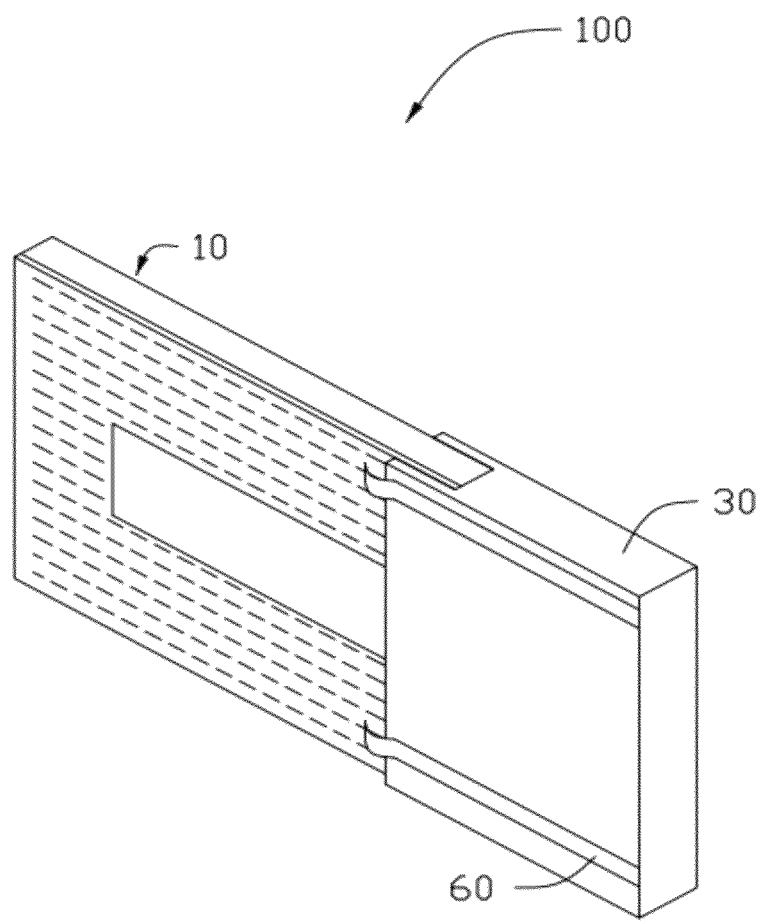
FIG. 1 is an isometric view of one embodiment of a cleaning device.

Referring to FIG. 1, one embodiment of a cleaning device 100 includes a support 30, a cleaning arm 10, and a plurality of conductive wires 60. The cleaning arm 10 can be a planar sheet and has one end of the cleaning arm 10 fixed on the support 30. The conductive wires 60 are fixed on the support 30 and are electrically connected to the cleaning arm 10. In application, if a voltage is applied on the cleaning arm 10 via the conductive wires 60, the cleaning arm 10 could bend in a certain direction to function as a cleaner.

The support 30 can be metal, plastic, wood, glass, or any combination thereof. The support 30 is used to insulate the cleaning arm 10. One end of the cleaning arm 10 is insulated on the support 30 by, for example, a binder, tape, or screw. In one embodiment, the support 30 is a plastic bar, about 2 centimeters (cm) in length, and about 1 cm in width. The cleaning arm 10 is partly embedded in the support 30.

Figure 2:
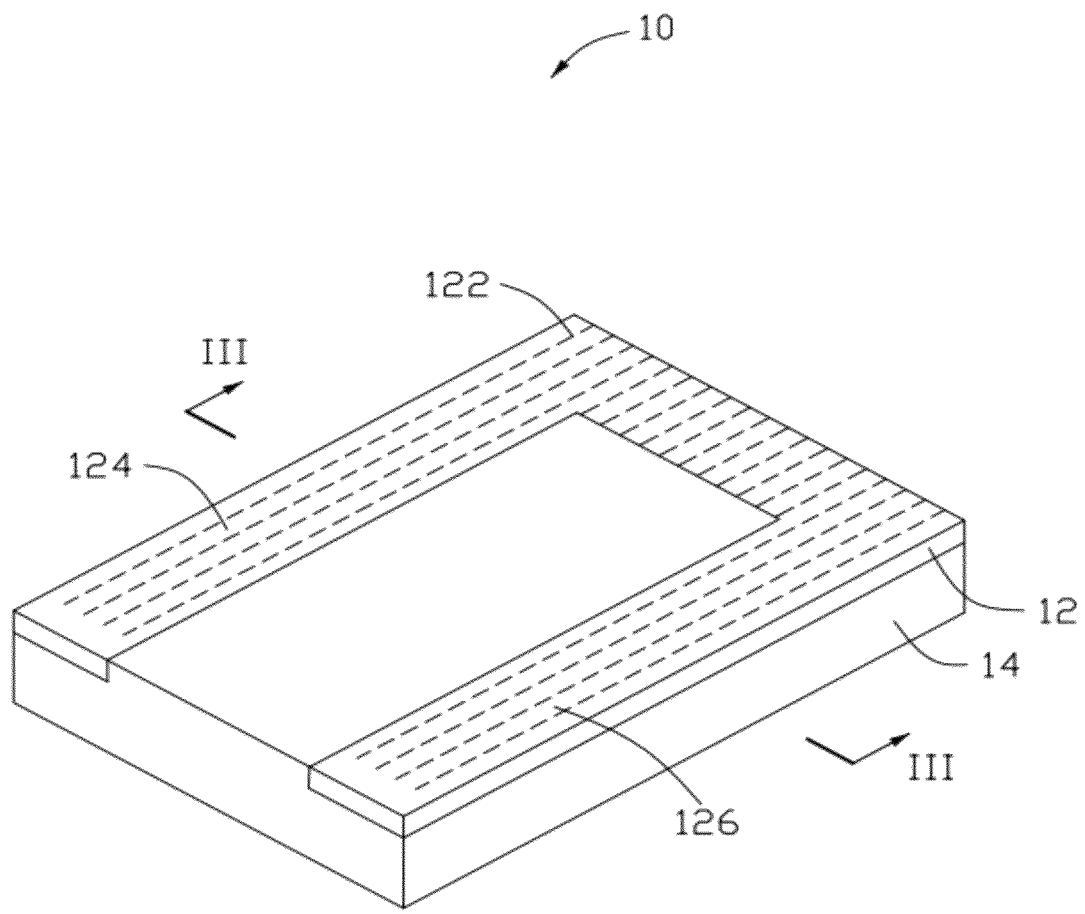
FIG. 2 is an isometric view of one embodiment of a cleaning arm of the cleaning device of FIG. 1.
Figure 3:
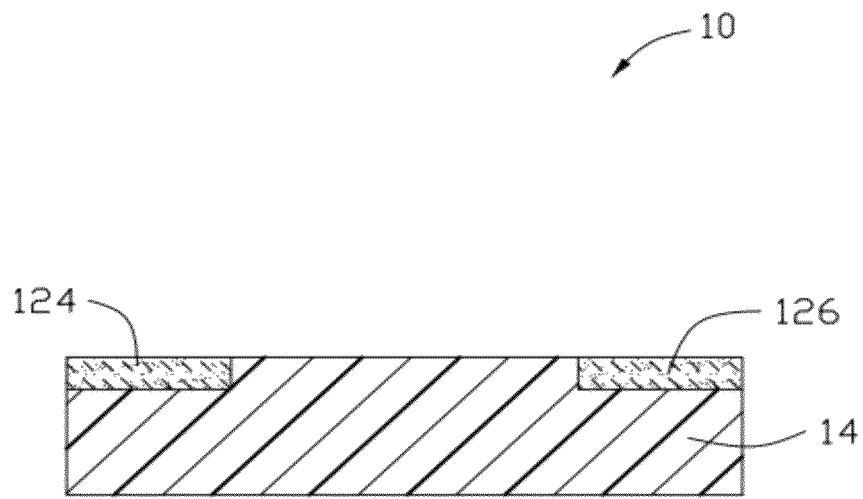
FIG. 3 is a cross-sectional view of the cleaning arm of FIG. 2, taken along a line III-III.

Referring to FIG. 2 and FIG. 3, the cleaning arm 10 includes a flexible polymer matrix 14 and a carbon nanotube film structure 12. The carbon nanotube film structure 12 has a thermal expansion coefficient less than that of the flexible polymer matrix 14. The carbon nanotube film structure 12 can be disposed on one surface of the flexible polymer matrix 14. A thickness of the cleaning arm 10 can range from about 20 micrometers to about 5 millimeters.

The flexible polymer matrix 14 can be a sheet having a thickness ranging from about 20 micrometers to about 5 millimeters. The shape of the flexible polymer matrix 14 is not limited and may be, for example, round or rectangular (shown in FIG. 2), and have other thickness ranges. A material of the flexible polymer matrix 14 can be silicone elastomer, poly methyl methacrylate, polyurethane, epoxy resin, polypropylene acid ethyl ester, acrylic acid ester, polystyrene, polybutadiene, polyacrylonitrile, polyaniline, polypyrrole, polythiophene or combinations thereof. In one embodiment, the flexible polymer matrix 14 can be a rectangular plate made of silicone elastomer with a thickness of about 0.7 millimeters, a length of about 60 millimeters, and a width of about 10 millimeters.

In one embodiment, the carbon nanotube film structure 12 can be at least partly embedded into the flexible polymer matrix 14 through the surface of the flexible polymer matrix 14. The carbon nanotube film structure 12 can include a plurality of micropores. The flexible polymer matrix 14 can permeate the micropores of the carbon nanotube film structure 12. In some embodiments, the carbon nanotube film structure 12 and the flexible polymer matrix 14 can be combined by: (1) putting the carbon nanotube film structure 12 on the flexible polymer matrix 14 which is in a viscous-liquid state; and (2) solidifying the flexible polymer matrix 14 after the flexible polymer matrix 14 has permeated the micropores of the carbon nanotube film structure 12. The carbon nanotube film structure 12 and the flexible polymer matrix 14 can bind together because material of the flexible polymer matrix 14 is permeated in the micropores of the carbon nanotube film structure 12. Alternatively, the entire carbon nanotube film structure 12 can be attached on a surface of the flexible polymer matrix 14.

After the carbon nanotube film structure 12 has combined with the flexible polymer matrix 14, the carbon nanotube film structure 12 can be substantially parallel to and offset from a central plane in a thickness direction of the flexible polymer matrix 14. In the embodiment shown in FIGS. 2-3, the top surface of the carbon nanotube film structure 12 is coplanar with the top surface of the flexible polymer matrix 14. Furthermore, the ratio between the thickness of the carbon nanotube film structure 12 and the flexible polymer matrix 14 can be between about 1:200 to about 1:5. In one embodiment, the ratio between the thickness of the carbon nanotube film structure 12 and the flexible polymer matrix 14 can be between about 1:25 to about 1:20.

Figure 4:
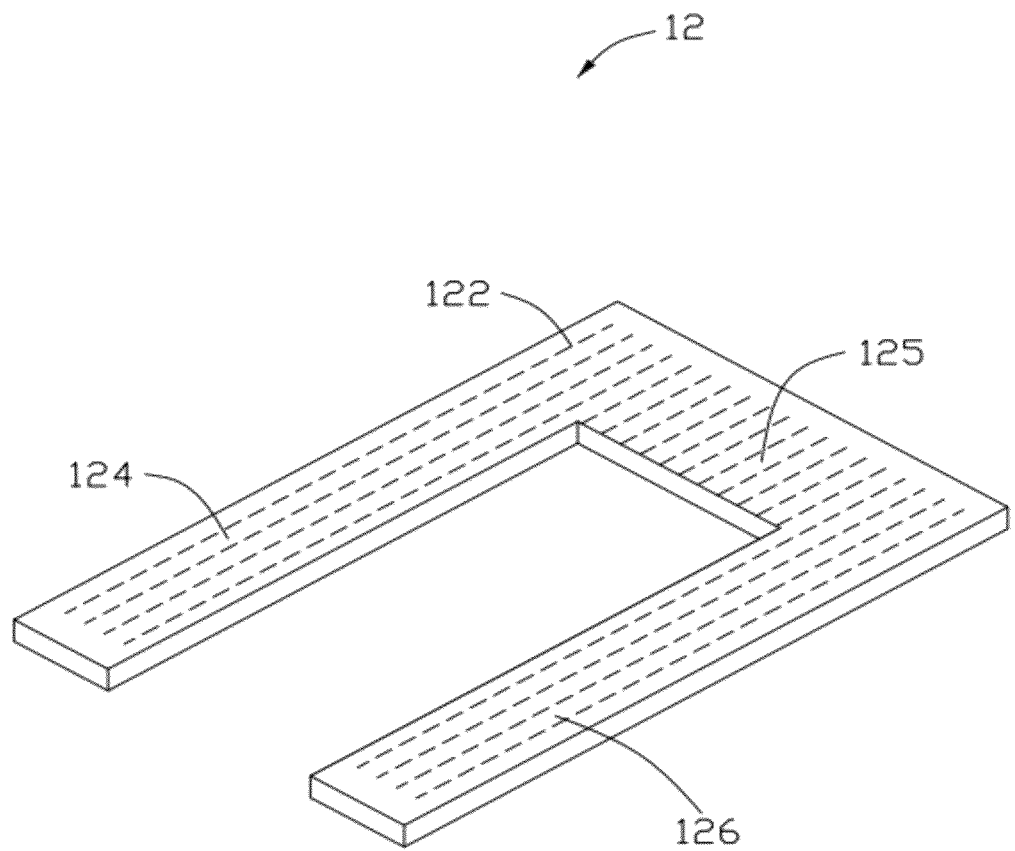
FIG. 4 is an isometric view of one embodiment of a carbon nanotube film structure of the cleaning arm of FIG. 2.

Referring also to FIG. 4, the carbon nanotube film structure 12 can extend along a curve on the surface of the flexible polymer matrix 14, and can be divided into a first portion 124, a second portion 126, and a connecting portion 125. The first portion 124 and the second portion 126 are separated from each other at a set interval. The first portion 124 and the second portion 126 are located at same side of the connection portion 125. The connecting portion 125 can connect a first end of the first portion 124 to a first end of the second portion 126. Second ends of the first portion 124 and the second portion 126 are away from the connecting portion 125, such that the first portion 124, the second portion 126, and the connecting portion 125 can cooperatively form a U shape. Each of the first portion 124 and the second portion 126 can be connected to one of the conductive wires 60, such that a conductive path can be formed from the first portion 124, through the connecting portion 125, to the second portion 126. A voltage can be applied to the first portion 124 and the second portion 126 via the conductive wires 60.

Figure 5:
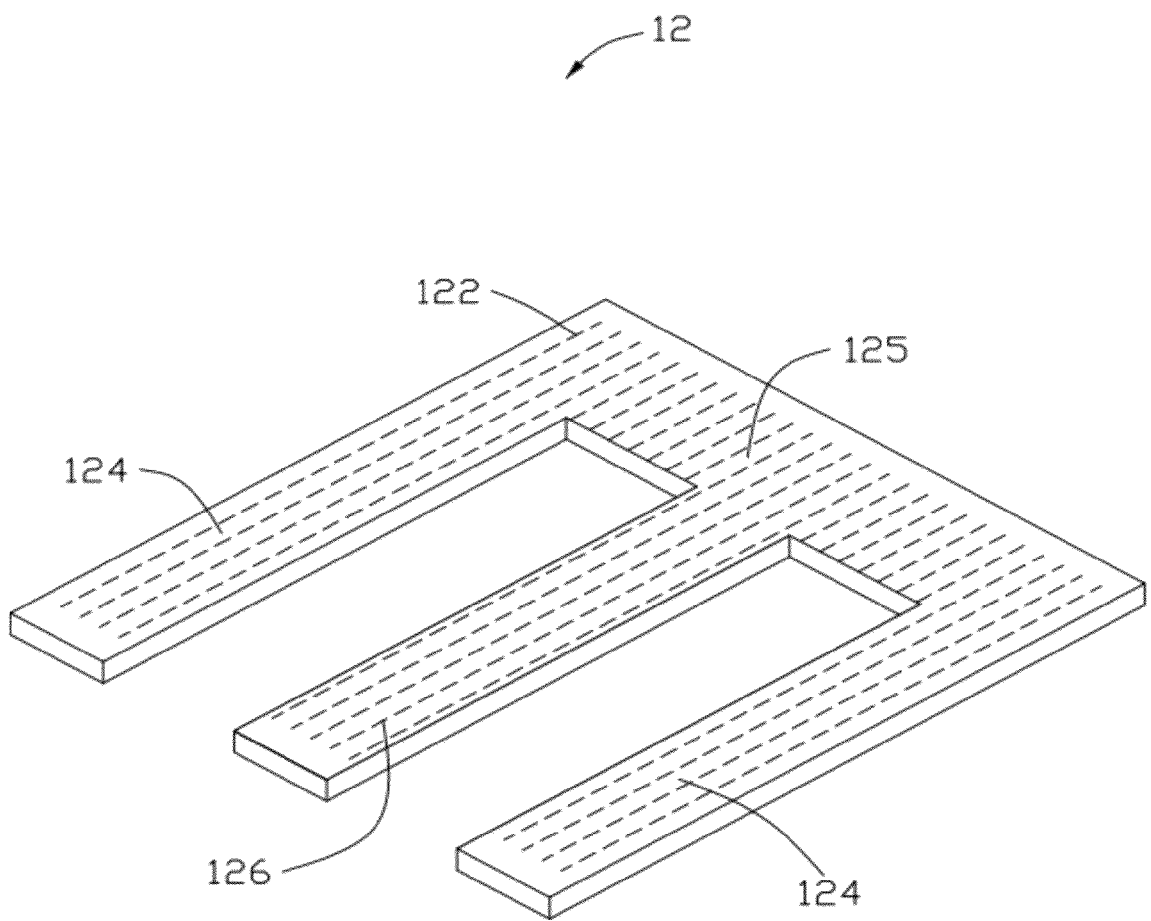
FIG. 5 is an isometric view of another embodiment of a carbon nanotube film structure of the cleaning arm of FIG. 2.

It is to be understood that the carbon nanotube film structure 12 can also include two first portions 124, one second portion 126, and one connecting portion 125. Referring to FIG. 5, the two first portions 124 and one second portion 126 are located at same side of the connecting portion 125. The connecting portion 125 can connect a first end of the two first portions 124 to one end of the second portion 126. Second ends of the two first portions 124 and the second portion 126 are away from the connecting portion 125, such that the two first portions 124, the second portion 126, and the connecting portion 125 cooperatively form a M shape.

Figure 6:
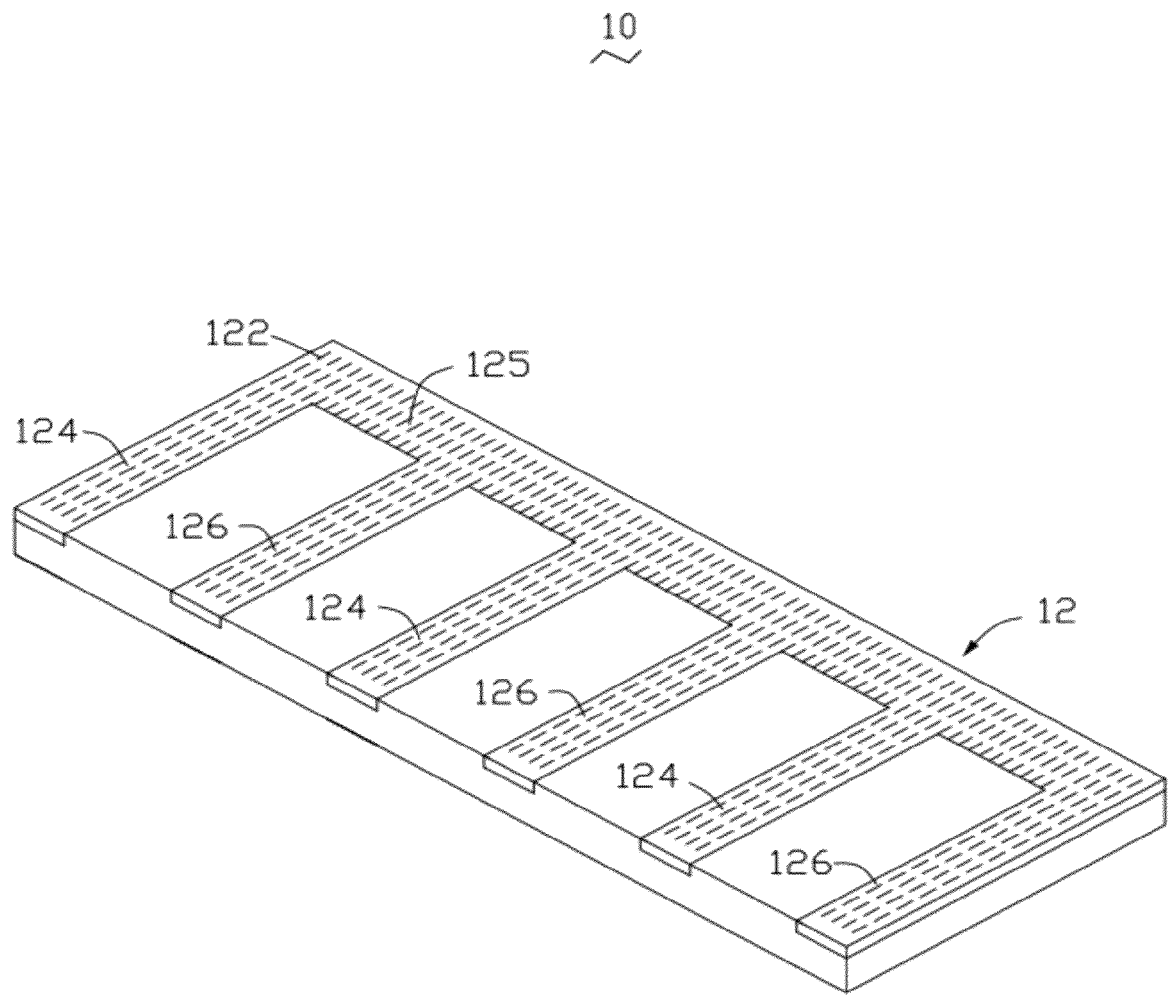
FIG. 6 is an isometric view of another embodiment of a cleaning arm.

Referring to FIG. 6, the carbon nanotube film structure 12 can include a plurality of first portions 124, a plurality of second portions 126, and a connecting portion 125. The first portions 124 and the second portions 126 are alternatively positioned at a same side of the connecting portion 125 at desired intervals. The first portions 124 and the second portions 126 extend to the connecting portion 125 along a direction substantially perpendicular to the longitudinal direction of the connecting portion 125. The first portions 124 can be connected to positive electrodes, and the second portions 126 can be connected to negative electrodes. In one embodiment, the carbon nanotube structure 12 includes three first portions 124 and three second portions 126.

The first portion 124, the second portion 126, and the connecting portion 125 can be formed by cutting one carbon nanotube film or a plurality of stacked carbon nanotube films into a desired shape. The carbon nanotube film can be a drawn carbon nanotube film, a flocculated carbon nanotube film, or a pressed carbon nanotube film. The carbon nanotube film structure 12 can include one drawn carbon nanotube film, one flocculated carbon nanotube film, one pressed carbon nanotube film, or combinations thereof. Some examples of the drawn carbon nanotube film, the flocculated carbon nanotube film, and pressed carbon nanotube film are described below.

In one embodiment, the carbon nanotube film structure 12 is about 6 cm in length, about 1 cm in width, and about 100 micrometers (um) in thickness. Each of the first portion 124 and the second portion 126 is a rectangular sheet which is about 5 cm in length and about 0.4 cm in width. The set interval between the first electric part 124 and the second electric part 126 is about 0.2 cm. The connecting portion 125 is a square sheet with a side length of about 1 cm.

Drawn Carbon Nanotube Film

Figure 7:
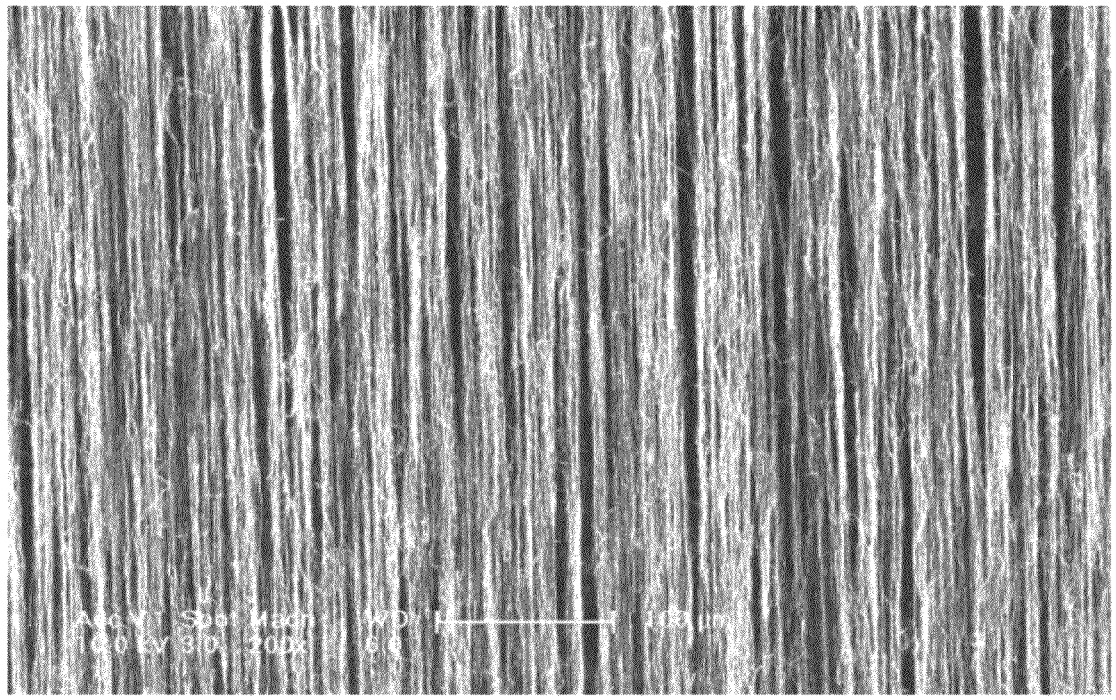
FIG. 7 is a Scanning Electron Microscope (SEM) image of a drawn carbon nanotube film.

In one embodiment, the carbon nanotube film structure 12 includes at least one drawn carbon nanotube film. A film can be drawn from a carbon nanotube array, to obtain a drawn carbon nanotube film. Examples of drawn carbon nanotube films are taught by U.S. Pat. No. 7,045,108 to Jiang et al., and WO 2007015710 to Zhang et al. The drawn carbon nanotube film includes a plurality of successive and oriented carbon nanotubes joined end-to-end lengthwise by van der Waals attractive force therebetween. The drawn carbon nanotube film is a free-standing film. The term "free-standing" includes, but is not limited to, a structure that does not have to be supported by a substrate and can sustain the weight of it when it is hoisted by a portion thereof without any significant damage to its structural integrity. Each drawn carbon nanotube film can include a plurality of successively oriented carbon nanotube segments joined end-to-end by van der Waals attractive force therebetween. Each carbon nanotube segment can include a plurality of carbon nanotubes 122 substantially parallel to each other, and combined by van der Waals attractive force therebetween. As can be seen in FIG. 7, some variations can occur in the drawn carbon nanotube film. The carbon nanotubes 122 in the drawn carbon nanotube film are substantially oriented along a preferred orientation. The carbon nanotube film can be treated with an organic solvent to increase the mechanical strength and toughness of the carbon nanotube film and reduce the coefficient of friction of the carbon nanotube film. The thickness of the carbon nanotube film can range from about 0.5 nm to about 100 μm.

In other embodiments, the carbon nanotube film structure 12 can include two or more coplanar carbon nanotube films, and can include layers of coplanar carbon nanotube films. Additionally, if the carbon nanotubes in the carbon nanotube film are aligned along one preferred orientation (e.g., the drawn carbon nanotube film), an angle can exist between the orientations of carbon nanotubes in adjacent films, whether stacked or arrayed side by side. Adjacent carbon nanotube films can be combined by just the van der Waals attractive force therebetween. The number of layers of the carbon nanotube films is not limited. An angle between the aligned directions of the carbon nanotubes in two adjacent carbon nanotube films can range from about 0 degrees to about 90 degrees. The carbon nanotube film structure 12 employing these films can have a plurality of micropores. Stacking the carbon nanotube films will also add to the structural integrity of the carbon nanotube film structure 12.

Flocculated Carbon Nanotube Film

Figure 8:
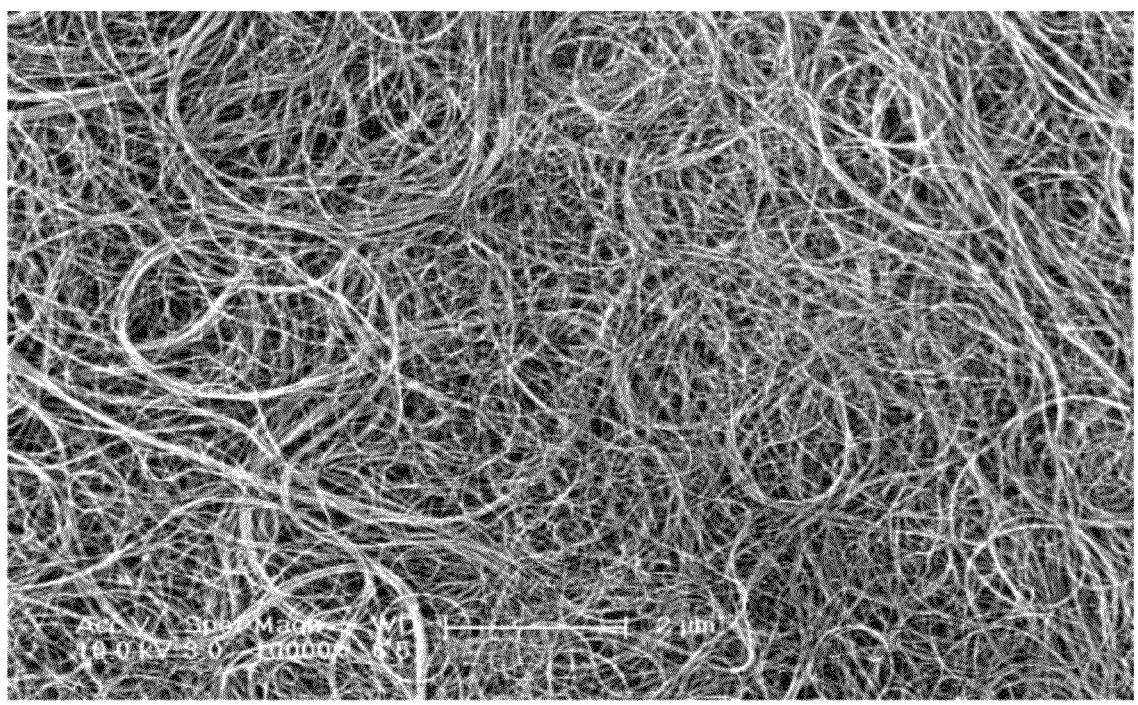
FIG. 8 is an SEM image of a flocculated carbon nanotube film.

In other embodiments, the carbon nanotube film structure 12 can include a flocculated carbon nanotube film. Referring to FIG. 8, the flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. It is understood that the flocculated carbon nanotube film is very porous. The sizes of the micropores can be less than 10 μm. The porous nature of the flocculated carbon nanotube film will increase the specific surface area of the carbon nanotube film structure. Further, because the carbon nanotubes in the carbon film nanotube structure 12 are entangled with each other, the carbon nanotube film structure 12 employing the flocculated carbon nanotube film has excellent durability, and can be fashioned into desired shapes with a low risk to the integrity of the carbon nanotube film structure 12. The thickness of the flocculated carbon nanotube film can range from about 0.5 nm to about 1 mm.

Pressed Carbon Nanotube Film

Figure 9:
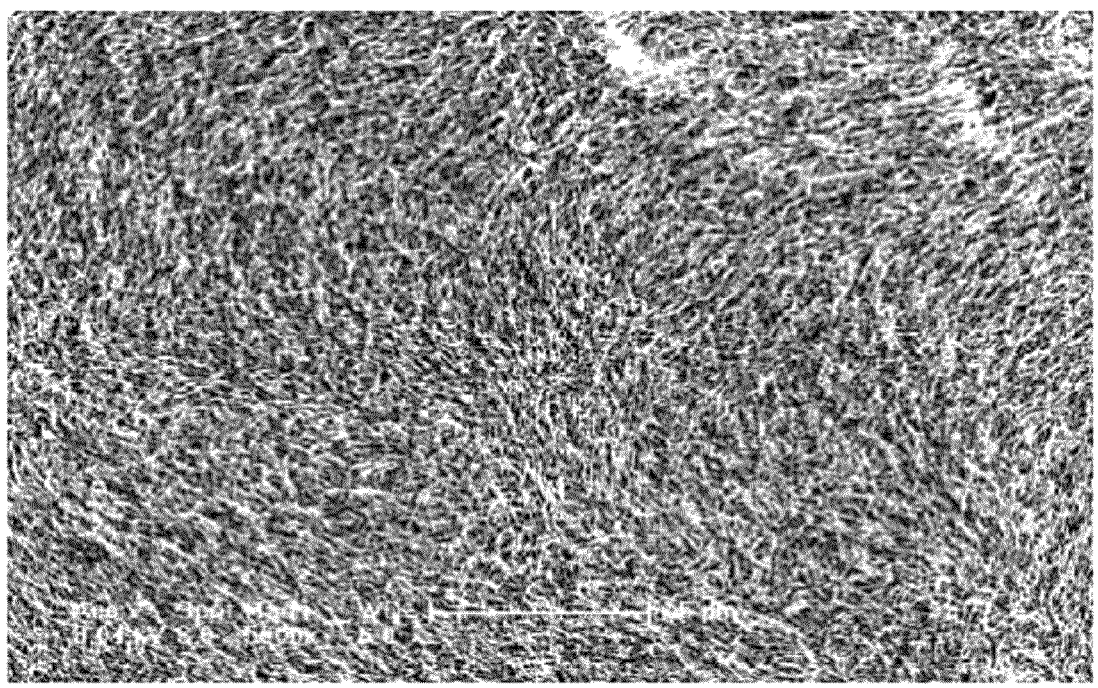
FIG. 9 is an SEM image of a pressed carbon nanotube film.

In other embodiments, the carbon nanotube film structure 12 can include a pressed carbon nanotube film. Referring to FIG. 9, the pressed carbon nanotube film can be a free-standing carbon nanotube film. The carbon nanotubes in the pressed carbon nanotube film are arranged along a same direction or along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to about 15 degrees. The greater the pressure applied, the smaller the angle obtained. If the carbon nanotubes in the pressed carbon nanotube film are arranged along different directions, the carbon nanotube film structure 12 can be isotropic. Here, "isotropic" means the carbon nanotube film has properties substantially identical in all directions substantially parallel to a surface of the carbon nanotube film. The thickness of the pressed carbon nanotube film ranges from about 0.5 nm to about 1 mm. An example of pressed carbon nanotube film is taught by US PGPub. 20080299031A1 to Liu et al.

In the embodiment of FIGS. 1-3, the carbon nanotube film structure 12 includes a plurality of drawn carbon nanotube films stacked together. The carbon nanotubes of each drawn carbon nanotube film can be substantially aligned along one preferred orientation. Further, the carbon nanotubes of the drawn carbon nanotube films can be substantially aligned along one preferred orientation. Each of the first portion 124 and the second portion 126 can be a long strip which has a longitudinal direction substantially parallel to the preferred orientation. The connecting portion 125 can be a long strip which has a longitudinal direction substantially perpendicular to the preferred orientation.

A first side of the cleaning arm 10, defined at the side of the free ends of the first portion 124 and the second portion 126, are embedded in the support 30. The connection portion is located at a second side of the cleaning arm 10 away from the support 30. The second side of the cleaning arm 10 can move freely in the thickness direction of the cleaning arm 10. The conductive wires 60 can be located on the support 30. Each one of the conductive wires 60 is electrically connected with the first portion 124 or the second portion 126 at the first side of the cleaning arm 10. The numbers of the conductive wires 60 is the same as the sum of the first portions 124 and the second portions 126. The conductive wires 60 can be located on the support 30, and each one of the conductive wires 60 is electrically connected with one end of the first portion 124 or the second portion 126 away from the connecting portion 125. A voltage can be applied on the cleaning arm 10 via the conductive wires 60.

The operating principle of the cleaning device 100 is as follows. When a voltage is applied to the carbon nanotube film structure 12 via the first portion 124 and the second portion 126, a current flows through the carbon nanotube film structure 12. The carbon nanotubes 122 convert the electric energy to heat thereby heating and expanding the flexible polymer matrix 14. The thermal expansion coefficients of the flexible polymer matrix 14 and the carbon nanotube film structure 12 are different so that the cleaning arm 10 bends in a direction oriented to the carbon nanotube film structure 12 which has a smaller thermal expansion coefficient. Therefore, the cleaning arm 10 will bend along a thickness direction of the cleaning arm 10 so as to rub, or brush a surface of a device or other elements.

Because the bending of the cleaning arm 10 expands from heating the flexible polymer matrix 14, the cleaning arm 10 can handle a voltage greater than 10 volts. Thus the cleaning device 100 has a much more useful voltage range.

In one embodiment, each of the flexible polymer matrix 14 and the carbon nanotube film structure 12 can have a U-shape. The carbon nanotube film structure 12 can be stacked on the flexible polymer matrix 14 with or without material of the flexible polymer matrix 14 permeating the carbon nanotube film structure 12. The flexible polymer matrix 14 and the carbon nanotube film structure 12 together have a U shape outer configuration.

Figure 10:
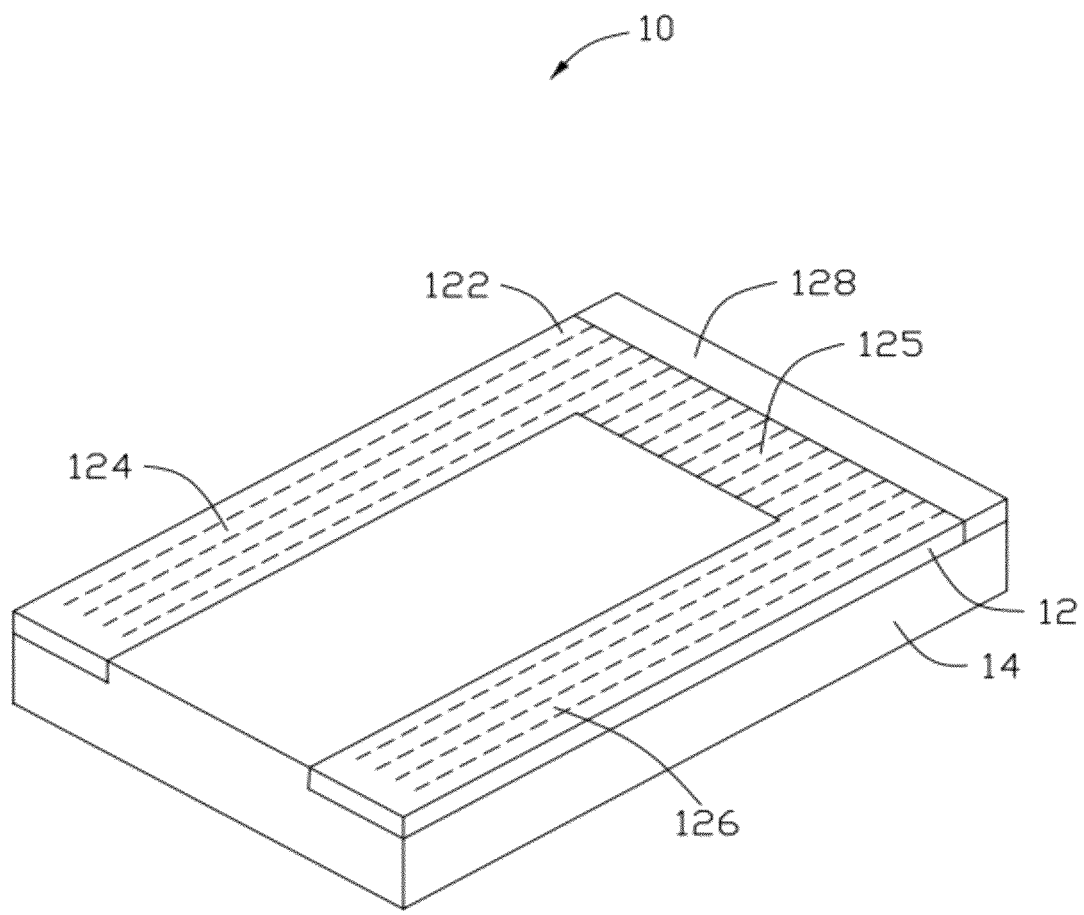
FIG. 10 an isometric view of yet another embodiment of a cleaning arm.

Referring to FIG. 10, to increase the conductivity of the connecting portion 125, a conductivity enhancement layer 128 can be provided on the second side of the cleaning arm 10. The conductivity enhancement layer 128 at least partly covers the connecting portion 125. The conductivity enhancement layer 128 can be made of metals having good conductivity, such as gold, platinum, palladium, silver, copper, and iron. The conductivity enhancement layer 128 can also be conductive adhesive, such as silver glue.

Figure 11:
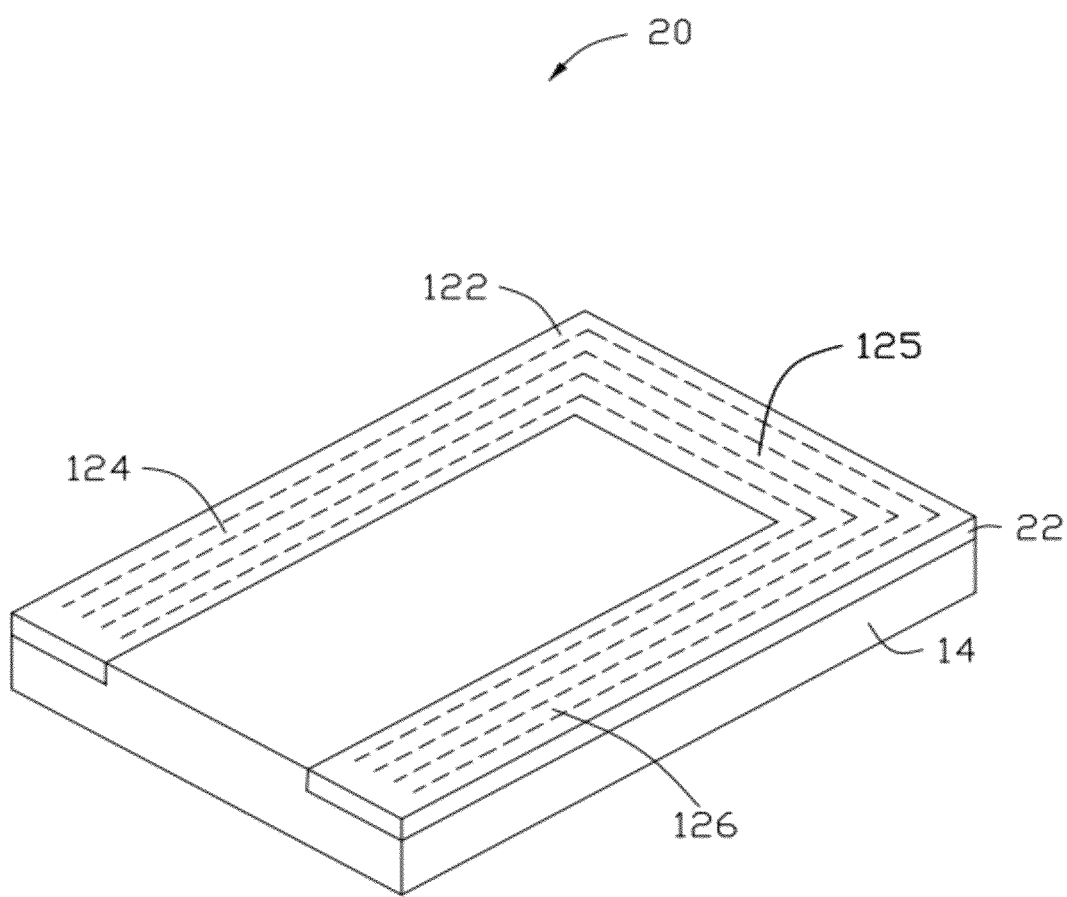
FIG. 11 is an isometric view of still yet another embodiment of a cleaning arm.

Referring to FIG. 11, another embodiment of a cleaning arm 20 is similar to the embodiment of the cleaning arm 10, except that the carbon nanotubes 122 of the carbon nanotube film structure 22 are aligned along different directions. The carbon nanotubes 122 in the connecting portion 125 of the carbon nanotube film structure 22 are substantially aligned along a first direction from the first portion 124 to the second portion 126 of the carbon nanotube film structure 22. The carbon nanotubes 122 in the first portion 124 and the second portion 126 of the carbon nanotube film structure 22 are substantially aligned along a second direction. The second direction is not parallel to the first direction. In the embodiment shown in FIG. 10, the first direction can be substantially perpendicular to the second direction. In the carbon nanotube film structure 22, carbon nanotubes 122 are joined end-to-end by van der Waals attractive force therebetween and extend continuously along the first portion 124 through the connecting portion 125 to the second portion 126, such that a conductive path can be substantially defined from the first portion 124 through the connecting portion 125 to the second portion 126.

In one embodiment, the carbon nanotube film structure 22 and the flexible polymer matrix 14 can be combined by: (1) putting one drawn carbon nanotube film on the flexible polymer matrix 14 which is in a viscous-liquid state; and (2) solidifying the flexible polymer matrix 14 after material of the flexible polymer matrix 14 has permeated in the micropores of the drawn carbon nanotube film. In step (1), after one portion of the drawn carbon nanotube film has been put on the flexible polymer matrix 14 to form the first portion 124, the drawn carbon nanotube film is bent about 90 degrees and then put on the flexible polymer matrix 14 to form the connecting portion 125. After the connecting portion 125 has been formed, the drawn carbon nanotube film is further bent about 90 degrees and then put on the flexible polymer matrix 14 to form the second portion 126. Alternatively, a plurality of drawn carbon nanotube films can be placed on the flexible polymer matrix 14, which is in a viscous-liquid state, in the form of a U shape. The flexible polymer matrix 14 is then solidified after material of the flexible polymer matrix 14 has permeated the micropores of the drawn carbon nanotube films.

Figure 12:
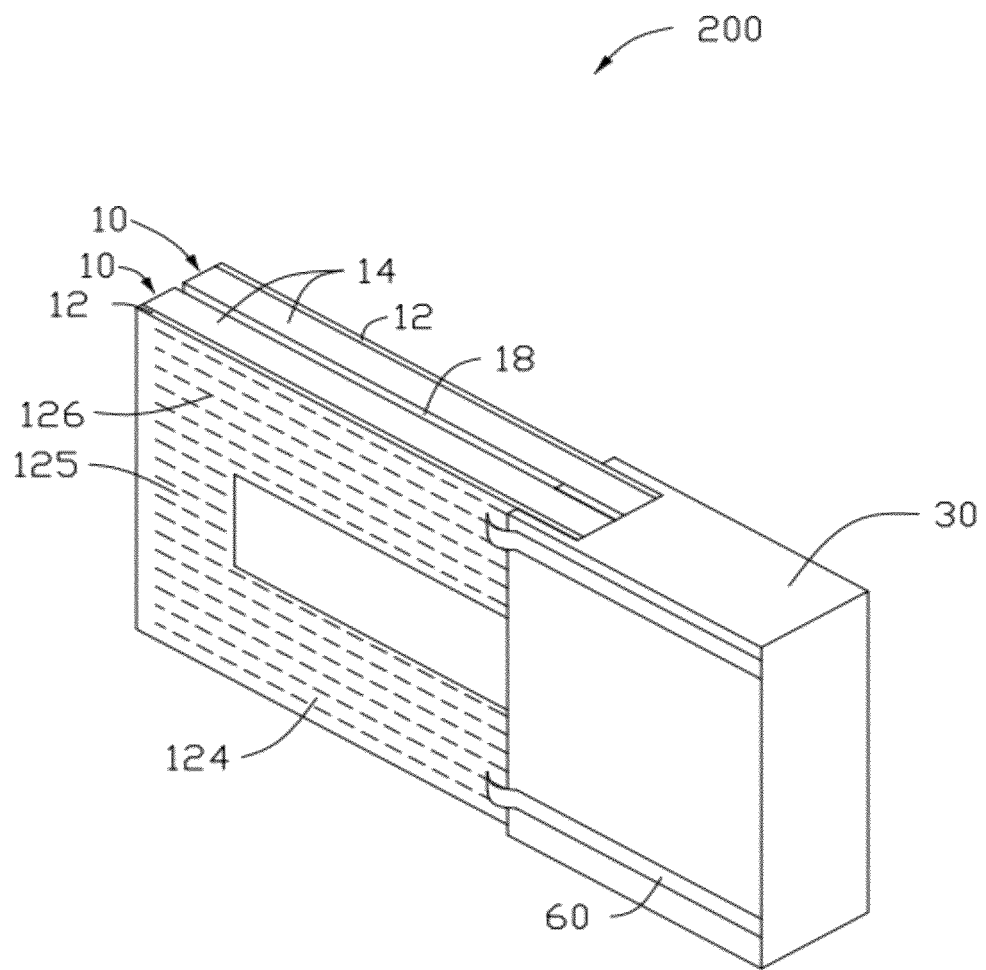
FIG. 12 is an isometric view of another embodiment of a cleaning device.
Figure 13:
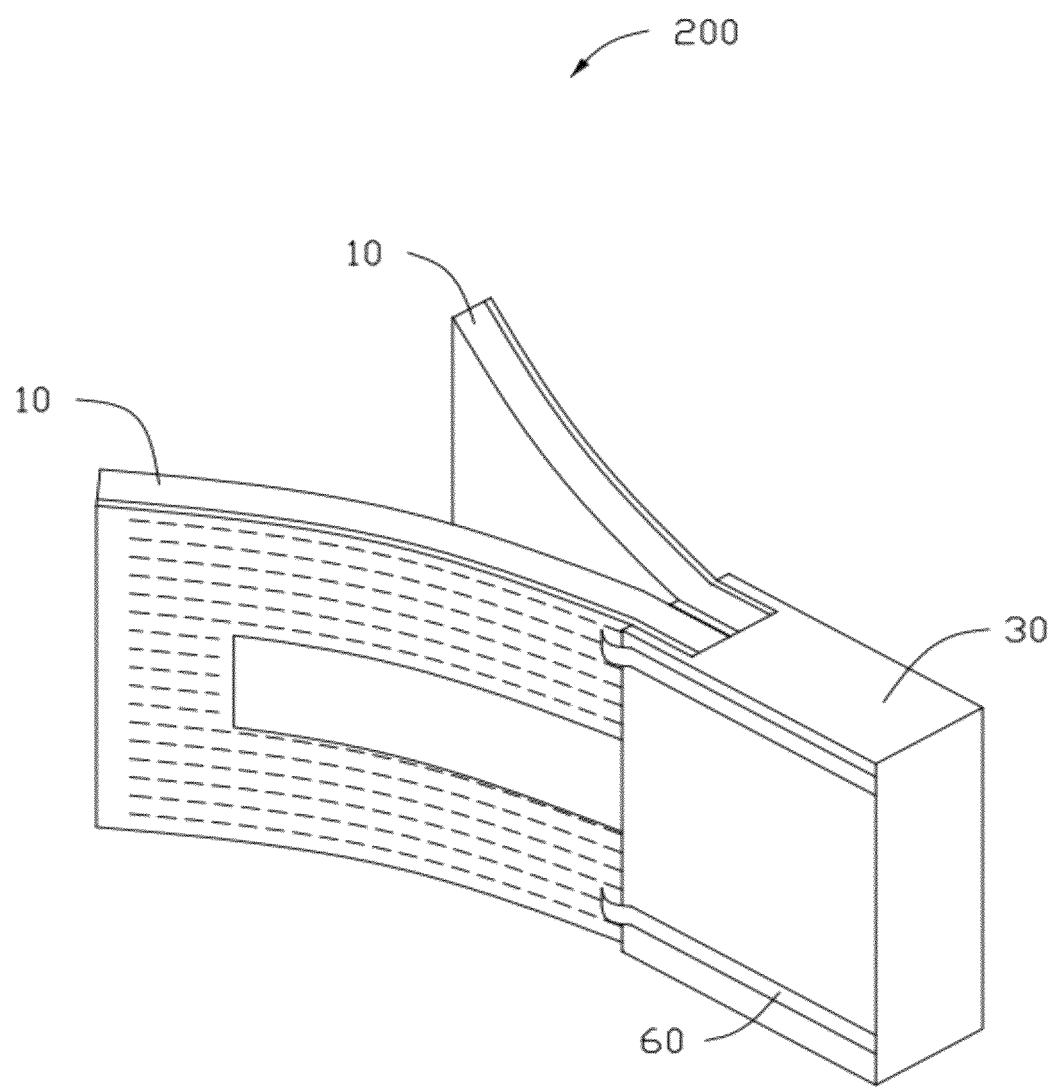
FIG. 13 is an isometric view of the cleaning device of FIG. 12 in application.

FIG. 12 is a schematic view of another embodiment of a cleaning device 200. The cleaning device 200 is similar to the cleaning device 100 shown in FIG. 2, except for the addition of another cleaning arm 10 and two conductive wires 60. Two cleaning arms 10 of the cleaning device 200 are spaced and parallel to each other. The flexible polymer matrixes 14 of the two cleaning arms 10 are spaced with and facing each other, and an interval 18 is defined between the spaced flexible polymer matrixes 14 of the two cleaning arms 10. The interval 18 can be adjusted according to application. As can be seen in FIG. 13, if voltages are separately applied to the two cleaning arms 10, the two cleaning arms 10 can deviate from each other.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A cleaning device comprising a support and a cleaning arm comprising a flexible polymer matrix and a carbon nanotube film structure partly embedded into the flexible polymer matrix, the carbon nanotube film structure comprising a plurality of carbon nanotubes combined by van der Waals attractive force therebetween, wherein the flexible polymer matrix is a rectangular sheet structure; the carbon nanotube film structure defines a first portion, a second portion spaced to the first portion, and a connect portion connected to the first portion and the second portion; the first portion and the second portion being located at a same side of the connect portion; and the first portion, the second portion and the connect portion are coplanar rectangular sheet structures.

2. The cleaning device of claim 1, wherein the carbon nanotube film structure is substantially parallel to and offset from a central plane of the flexible polymer matrix.

3. The cleaning device of claim 1, wherein the first portion, the second portion, and the connect portion cooperatively form a U shape.

4. The cleaning device of claim 3, wherein the plurality of carbon nanotubes are substantially aligned along a preferred orientation substantially parallel to a longitudinal direction of the first portion.

5. The cleaning device of claim 4, wherein the longitudinal direction of the first portion is perpendicular to a longitudinal direction of the connect portion.

6. The cleaning device of claim 1, wherein the carbon nanotube film structure is a drawn carbon nanotube film, a flocculated carbon nanotube film, a pressed carbon nanotube film, or combinations thereof.

7. The cleaning device of claim 1, wherein the flexible polymer matrix has a thickness ranging from about 20 micrometers to about 5 millimeters.

8. The cleaning device of claim 7, wherein a ratio between the thickness of the carbon nanotube film structure and the flexible polymer matrix is between about 1:25 to about 1:20.

9. The cleaning device of claim 1, wherein the plurality of carbon nanotubes is aligned along a direction parallel to a contacting surface of the flexible polymer matrix with the carbon nanotube structure.

10. A cleaning device comprising a support and a cleaning arm comprising a flexible polymer matrix and a carbon nanotube film structure entirely embedded into the flexible polymer matrix, the carbon nanotube film structure comprising a plurality of carbon nanotubes combined by van der Waals attractive force therebetween, wherein the flexible polymer matrix is a rectangular sheet structure; the carbon nanotube film structure comprises a first portion, a second portion spaced to the first portion, and a connect portion connected to the first portion and the second portion; the first portion and the second portion being located at a same side of the connect portion; and a top surface of the carbon nanotube film structure is coplanar with a top surface of the flexible polymer matrix.

11. The cleaning device of claim 10, wherein a ratio between the thickness of the carbon nanotube film structure and the flexible polymer matrix is between about 1:200 to about 1:5.

12. The cleaning device of claim 11, wherein the flexible polymer matrix has a thickness ranging from about 20 micrometers to about 5 millimeters.

13. The cleaning device of claim 10, wherein the plurality of carbon nanotubes is aligned along a direction parallel to the top surface of the flexible polymer matrix.

14. The cleaning device of claim 10, wherein the second portion and the connect portion are rectangular sheet structures.

15. A cleaning device comprising a support and a cleaning arm comprising a flexible polymer matrix and a carbon nanotube film structure located on a surface of the flexible polymer matrix; wherein the flexible polymer matrix is a rectangular sheet structure, the carbon nanotube film structure is partly embedded into the flexible polymer matrix, and the carbon nanotube film structure comprising a plurality of carbon nanotubes aligned along a same direction parallel to the surface of the flexible polymer matrix.

16. The cleaning device of claim 15, wherein the carbon nanotube film structure defines a first portion, a second portion spaced to the first portion, and a connect portion connected to the first portion and the second portion; and the first portion and the second portion being located at a same side of the connect portion.

17. The cleaning device of claim 15, wherein the first portion, the second portion and the connect portion are rectangular sheet structures coplanar with each other.

* * * * *